April 2, 1968  A. W. McKEE, JR., ET AL  3,376,187
METHOD OF FORMING A DECORATIVE SURFACE COVERING
AND ARTICLE FORMED THEREBY
Filed Dec. 26, 1962
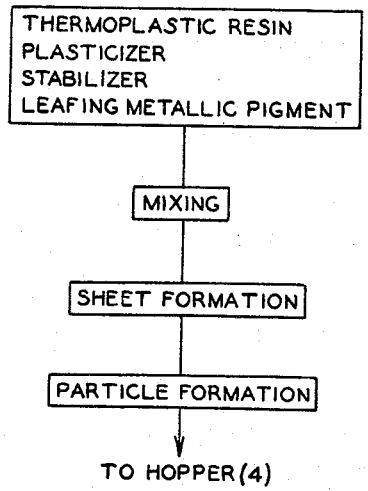
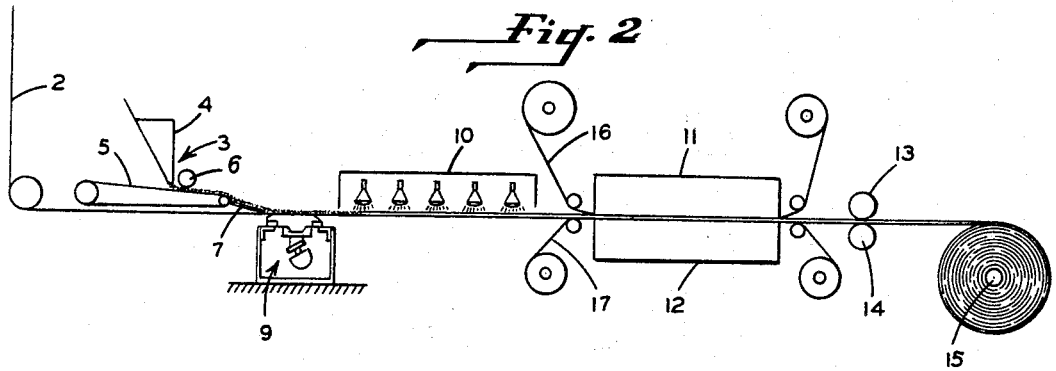
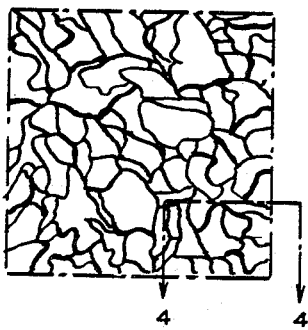
INVENTOR.
ALLAN W. McKEE, JR.
DAVID T. ZENTMYER
BY

United States Patent Office 3,376,187
Patented Apr. 2, 1968

3,376,187
METHOD OF FORMING A DECORATIVE SURFACE COVERING AND ARTICLE FORMED THEREBY
Allan W. McKee, Jr., Millersville, and David T. Zentmyer, Lancaster Township, Lancaster County, Pa., assignors to Armstrong Cork Company, Lancaster, Pa., a corporation of Pennsylvania
Filed Dec. 26, 1962, Ser. No. 247,076
6 Claims. (Cl. 161—164)

This invention relates to a method of forming a decorative surface covering and more specifically relates to a method of forming a surface covering having novel highlighting effects and a unique terrazzo appearance.

The use of metallic effects in vinyl floor materials has become quite prevalent in recent years. Such metallics greatly enhance the appearance of decorative surface coverings and serve to form many unique and attractive highlight effects. Some of the compositions utilized in providing such metallic highlights utilize metallic leafing pigments for this purpose.

We have now discovered a method by which particles of plasticized thermoplastic vinyl resin composition having metallic leafing pigments incorporated therein as the primary coloring and decorative material can be utilized in the production of decorative surface coverings in a manner such that the decorative appearance provided by the leafing metallic pigments is greatly enhanced, and such that a resilient flooring product having a unique terrazzo-like appearance is produced.

In forming the particles of plasticized thermoplastic vinyl resin composition which are utilized in forming the decorative surface coverings in accordance with this invention, pigments of the leafing metallic type, such as bronze, aluminum, copper, or gold leafing pigments, are incorporated into a plasticized thermoplastic vinyl resin composition which is then formed into a consolidated sheet by passing the pigmented plasticized vinyl resin between a series of calenders. The calenders act to fuse the composition and form a continuous sheet and at the same time leaf the pigment to give a high metallic gloss to the finished sheet. The sheet after formation is then cut by a suitable operation into flat particles.

The flat particles of sheeted material are then laid up onto a suitable carrier and passed under a heater, such as a radiant heater, to effect a differential shrinkage of the particles with an accompanying loss of plasticizer from the upper surface thereof. This heating acts to shrink the upper surfaces and to expose the edges of the particles. Due to the leafing action of the metallic pigment in the initial sheet formation, the top surfaces of the particles show a high metallic gloss or sheen with the color being dependent upon the particular leafing pigment used in the formulation thereof. Due to the leafing action of the pigment with the resulting orientation thereof, the turned-up edges of the particles which are exposed when the particles are heated are in turn much darker in color than the upper surface, the orientation of the metallic particles reducing any reflection at the edges.

The particles after the heating step are then consolidated with care being exercised to insure minimum distortion of the top surfaces of the particles. This can readily be accomplished by consolidating the particles between heated platens, using a conventional release paper between the upper platen and the particles if desired, care being exercised to insure uniform heating of the entire area and to avoid localized distortion. Consolidation of the heated particles by the use of heated platens with a uniform pressure causes the softer, more highly plasticized, lower portion of the particles to exude and fill the interstices between the particles and thus form a continuous sheet. The leafing action of the pigment in initial sheet formation prior to forming the particles causes the upper surface to have a metallic sheen with the edges of the particles being much darker. When the particles are heated and consolidated into a continuous sheet, the darker edge portions are exuded into and around the shinier exposed surfaces of the particles to form dark delineating lines so that each of the particles is surrounded by a dark halo, thus achieving a unique terrazzo-like appearance.

Features and objects of the present invention will appear from the following description thereof in which reference is made to the figures of the accompanying drawing.

In the drawing:

FIGURE 1 is a flow sheet illustrating the preparation of pigmented particles;

FIGURE 2 is a diagrammatic illustration of the process of preparing the decorative sheet material in accordance with our invention;

FIGURE 3 is a plan view of a typical section of the sheet goods produced in accordance with our invention; and FIGURE 4 is an enlarged cross-sectional view taken along the line 4—4 of FIGURE 3.

In order that the invention may be readily understood, certain embodiments of the method will be described in conjunction with the attached drawing.

Example 1

With reference to FIGURE 1 of the drawing, which illustrates a flow sheet for forming the particles which are subsequently used in forming the decorative surface coverings in accordance with this invention, the following typical formulations were prepared:

| Formulation | Percentage by Weight | | | | | |
|---|---|---|---|---|---|---|
| Bakelite resin VYFG, copolymer resin containing 97–98% polyvinyl chloride and 2–3% polyvinyl acetate | 74.42 | | | | | |
| Bakelite resin VYNW, copolymer resin containing 97–98% polyvinyl chloride and 2–3% polyvinyl acetate | | 58.92 | 55.30 | 56.90 | 73.70 | |
| Bakelite resin VYHH, copolymer resin containing 86% polyvinyl chloride and 14% polyvinyl acetate | | | 14.78 | 18.30 | 17.90 | |
| Goodrich resin Geon 209, copolymer resin containing 80% vinylidene chloride and 20% polyvinyl chloride | | | | | | 74.42 |
| Plasticizer, dioctyl phthalate | 16.28 | 16.12 | 16.00 | 16.40 | 16.12 | 16.28 |
| Plasticizer, epoxidized soya oil, Rohm & Haas G-62 | 1.55 | 1.54 | 1.70 | 1.60 | 1.54 | 1.55 |
| Barium-cadmium laurate stabilizer | 3.88 | 4.80 | 4.70 | 3.30 | 4.80 | 3.88 |
| Leafing metallic bronze pigment, U.S. Bronze 901XX | 3.87 | 3.84 | 4.00 | 3.90 | 3.84 | 3.87 |

Particles of each of the above formulations were prepared by mixing the formulations in a Banbury mixer to a mix temperature of 300° F. After thorough mixing in the Banbury, the mix was dropped onto a two-roll mill, one of the rolls being at 280° F. with the second roll being at 260° F., and sheeted to 0.015–0.020″. The sheet thus prepared was diced and ground into particles in a Fitzpatrick comminuting machine. The resultant particles were irregular in shape and ranged in size from approximately ¼″ in diameter down to less than ⅟₃₂″.

Particles thus formed were fed to (FIGURE 2) a volumetric feeding unit 3 which includes a hopper 4, a delivery conveyor 5, a metering roll 6, and a delivery chute 7, arranged to deliver a mass of the particles onto the backing 2. The backing 2, a beater saturated asbestos felt such as disclosed in Feigley Patent 2,759,813, with the particles disposed thereon is fed over a vibrator or a plurality of vibrators, as indicated diagrammatically at 9, where they are vibrated to form a thin layer one-two particles thick, .015–.025″, on the carrier sheet 2. The carrier sheet, having the thin layer of particles deposited thereon, is then passed under radiant heaters, indicated diagrammatically at 10, where they are heated just prior to pressing between the heated platens indicated diagrammatically at 11 and 12. This heating acts to shrink the upper surfaces and to expose the edges of the particles, some of the plasticizer being volatilized from the surface of the particles during this heating pretreatment. The temperature of the particles just prior to pressing is approximately 330° F. After passing under radiant heaters, the particles are pressed out onto the carrier, forming a continuous sheet. The uniform pressure causes the softer, more highly plasticized, lower portions of the particles to exude and fill the interstices between particles. To prevent sticking of the material to the platens of the press during the consolidation cycle, webs of release paper 16 and 17 may be interposed between the platen surfaces and the material being pressed as is well known in the manufacture of vinyl resin type surface coverings (see Dunlap Patent 2,772,141). During consolidation, at which point the vinyl layer was compressed to .012–.018″, the temperatures of the press platens were 330° F. top, 11, and about 250° F. bottom, 12. Press cycle was approximately 15 seconds including time to close the press and thus amounted to approximately 6 seconds at 4,000 pounds gauge pressure, or 1,400 pounds per square inch. After sufficient cooling, to about 150° F. or less, the release paper was stripped from the sheet and finished decorative surface covering was rolled up on the arbor illustrated diagrammatically at 15. Pull rolls, illustrated diagrammatically at 13 and 14, were used to insure proper and constant feeding of the material during the manufacturing operations.

As shown in FIGURE 3, in which a section of the floor covering formed in accordance with the method set forth in Example 1 is illustrated, the method produces a resilient flooring product having a unique terrazzo-like appearance formed of irregularly shaped particles of thermoplastic composition having a bronze-like sheen outlined by dark lines or halos formed during the pressing operation when the darker edge portions are exuded into and around the shinier exposed surfaces of the particles. A cross-sectional view of the flooring product, taken along the line 4—4 of FIGURE 3, is illustrated in FIGURE 4.

In the preparation of the mix from which the particles are formed, it is preferred to use, as the thermoplastic resins, copolymers of vinyl chloride and vinyl acetate in which the vinyl acetate portion of these resins can vary from approximately 2–14%; homopolymers of vinyl chloride resins having specific viscosities in the range from 0.19–0.40 as determined by the method specified in A.S.T.M. specification numbered D–1243–54; vinylidene chloride, polyvinyl chloride blends; and mixtures or blends of copolymers of vinyl chloride and vinyl acetate and homopolymers of vinyl chloride resins having the above-enumerated characteristics. All of the common plasticizers for thermoplastic vinyl resins, such as dioctyl phthalate and tricresyl phosphate, may be utilized. As the stabilizer any of the well known stabilizers for thermoplastic vinyl resins may be utilized, although it is preferred not to use the lead type stabilizers because of resultant resin opacity.

The pigments utilized in practicing this invention are metallic leafing pigments commonly used for simulated foil surfaces and preferably are highly polished lubricated platelets of aluminum, copper, or copper-containing alloys, the latter alloys being the commercial bronze pigments. The term "leafing" generally refers to the ability of the particular pigment to float to the surface of certain paint vehicles to give a high luster and generally is a measure of the metallic luster of this class of pigments. The leafing pigments actually do not float to the surface of the thermoplastic vinyl resin mixture during the sheet formation stage prior to particle formation but remain dispersed throughout the composition. They do, however, retain their bright luster due to the transparency of the thermoplastic vinyl composition, and during sheet formation they become orientated and achieve the same effect as that of the simulated foil surfaces as to their metallic sheen properties, and of course achieve much more satisfactory wearing characteristics.

As will be readily evident, the particles may be of any desired thickness depending on the gauge of product desired. The particle thickness may be used as a control of the widths of the dark lines outlining the individual shiny particles in the final product.

While a synthetic rubber saturated asbestos felt has been referred to as a suitable backing material or carrier sheet, other backing materials may be employed, such as burlap, cotton sheeting, oleo-resinous saturated felt, or asphalt saturated felt.

The product is ideally suited for use as a floor covering but may be used on walls, counter and table tops and elsewhere as a surface covering.

We claim:

1. A method of forming a thermoplastic vinyl resin surface covering having a unique terrazzo-like decorative effect comprised of distinctive design elements having a metallic sheen outlined by halos of contrasting darker metallic color which comprises, forming a mixture of particles of plasticized thermoplastic vinyl resin and a leafing metallic pigment, sheeting said mixture by consolidation under heat and pressure to form a continuous sheet and to leaf said metallic leafing pigment, severing the sheet thus formed into relatively flat particles, disposing said flat particles on a carrier to form a substantially continuous layer, heating said layer to a degree sufficient to shrink said particles and to expose the edges thereof, and forming a continuous sheet by consolidating the heated particles using a uniform pressure whereby the more highly plasticized portion of the particles exude to form a continuous sheet without materially distorting the upper surface of the particles.

2. A method according to claim 1 in which the thermoplastic vinyl resin is a copolymer of vinyl chloride and vinyl acetate in which the vinyl acetate portion is from 2–15% by weight of the resin.

3. A method according to claim 1 in which the thermoplastic vinyl resin is a homopolymer vinyl chloride resin having a specific viscosity in the range of from 0.19–0.40.

4. A method in accordance with claim 1 in which the thermoplastic vinyl resin is a vinylidene chloride-polyvinyl chloride blend.

5. A method in accordance with claim 1 in which the thermoplastic vinyl resin is a mixture of a copolymer of vinyl chloride and vinyl acetate in which the vinyl acetate portion is from 2–14% by weight of the resin and a homopolymer vinyl chloride resin having a specific viscosity of from 0.19–0.40.

6. A thermoplastic vinyl resin surface covering having a terrazzo-like appearance in which the decorative layer is comprised of a plurality of particles of a thermoplastic vinyl resin composition having a metallic sheen imparted thereto by means of a leafing metallic pigment incorporated in said composition with a matrix of a darker metallic color surrounding said particles and uniting said particles into a continuous decorative sheet material.

References Cited

UNITED STATES PATENTS

| | | |
|---|---|---|
| 2,888,975 | 6/1959 | Benedict. |
| 3,161,556 | 12/1964 | Slosberg. |
| 2,318,272 | 5/1943 | Weigle et al. _____ 156—242 |
| 2,513,434 | 7/1950 | Tinsley _____ 156—376 |
| 2,728,703 | 12/1955 | Kierman _____ 156—320 |
| 3,148,076 | 9/1964 | Snyder _____ 117—21 |

ROBERT F. BURNETT, *Primary Examiner.*

ALEXANDER WYMAN, JACOB H. STEINBERG,
*Examiners.*

R. A. FLORES, L. M. CARLIN, *Assistant Examiners.*